US012808438B2

(12) United States Patent
Schiefer et al.

(10) Patent No.: US 12,808,438 B2
(45) Date of Patent: Nov. 24, 2026

(54) SEALING RING, SEAL AND SEAL ARRANGEMENT FOR A RADIAL SHAFT

(71) Applicant: Trelleborg Sealing Solutions Germany GmbH, Stuttgart (DE)

(72) Inventors: Felix Schiefer, Stuttgart (DE); Christoph Schüle, Böblingen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 19/021,166

(22) Filed: Jan. 15, 2025

(65) Prior Publication Data

US 2025/0155023 A1 May 15, 2025

Related U.S. Application Data

(63) Continuation of application No. PCT/EP2023/069606, filed on Jul. 14, 2023.

(30) Foreign Application Priority Data

Jul. 18, 2022 (DE) ..................... 10 2022 117 919.2

(51) Int. Cl.
*F16J 15/3208* (2016.01)

(52) U.S. Cl.
CPC ................................ *F16J 15/3208* (2013.01)

(58) Field of Classification Search
CPC ... F16J 15/3208; F16J 15/3212; F16J 15/3276
See application file for complete search history.

(56) References Cited

U.S. PATENT DOCUMENTS 2,434,484 A * 1/1948 Chambers, Jr. ...... F16J 15/3212 277/553
2,581,817 A 1/1952 Simmer
3,127,185 A * 3/1964 Name not available .................... F16J 15/3212 277/553

(Continued)

FOREIGN PATENT DOCUMENTS

CN 103228963 A 7/2013
CN 106030167 A 10/2016

(Continued)

*Primary Examiner* — Eugene G Byrd
(74) *Attorney, Agent, or Firm* — Orbit IP, LLP; Marc G. Martino

(57) ABSTRACT

A radial shaft sealing ring includes a retaining portion and a sealing lip extending away from the retaining portion. The sealing lip has a sealing side having a sealing edge bearing in a dynamically sealing manner against the sealing surface of the shaft or machine part, and a rear side pointing away from the sealing edge in the radial direction and with a retaining groove for receiving an elastically deformable preloading element. The sealing lip has a plurality of radial depressions on the groove bottom of the retaining groove spaced apart from one another in the circumferential direction of the radial shaft sealing ring and/or a plurality of edge cutouts, extending in a radial direction from the retaining groove as far as sealing side. Each edge cutout is spaced apart from the sealing edge and can break through the groove bottom of the retaining groove.

19 Claims, 6 Drawing Sheets

(56) References Cited

U.S. PATENT DOCUMENTS

| | | | | | |
|---|---|---|---|---|---|
| 3,729,204 | A * | 4/1973 | Augustin | F16J 15/3208 277/559 |
| 4,114,245 | A * | 9/1978 | Bainard | F16J 15/328 29/527.1 |
| 4,350,347 | A | 9/1982 | Heinrich | |
| 5,653,449 | A * | 8/1997 | Martin | F16J 15/3276 277/910 |
| 5,730,444 | A | 3/1998 | Notter | |
| 5,928,676 | A | 7/1999 | Notter | |
| 8,439,363 | B2 | 5/2013 | Greca et al. | |
| 2014/0353914 | A1* | 12/2014 | Epshetsky | F16J 15/3208 277/300 |
| 2016/0319936 | A1* | 11/2016 | Dubois | F16J 15/3212 |
| 2017/0261108 | A1* | 9/2017 | Soler | F16J 15/3212 |
| 2019/0003595 | A1* | 1/2019 | Maskaliunas | F16J 15/3208 |

FOREIGN PATENT DOCUMENTS

| | | | | |
|---|---|---|---|---|
| DE | 1 995 317 | U | 10/1968 | |
| DE | 36 12 330 | C1 | 6/1987 | |
| DE | 38 30 711 | A1 | 3/1990 | |
| DE | 39 16 844 | A1 | 11/1990 | |
| DE | 697 12 664 | T2 | 10/2002 | |
| GB | 2040009 | A * | 8/1980 | F16J 15/3244 |
| JP | H02180385 | A * | 7/1990 | F16J 15/3244 |
| JP | 2005-003055 | A | 1/2005 | |
| JP | 2013-113320 | A | 6/2013 | |
| WO | WO-2024017779 | A1 * | 1/2024 | F16J 15/3208 |

* cited by examiner

SEALING RING, SEAL AND SEAL ARRANGEMENT FOR A RADIAL SHAFT

CROSS-REFERENCE TO RELATED APPLICATIONS

This continuation application claims priority to PCT/EP2023/069606 filed on Jul. 14, 2023 which has published as WO 2024/017779 A1 and also the German application number DE 10 2022 117 919.2 filed on Jul. 18, 2022, the entire contents of which are fully incorporated herein with these references.

DESCRIPTION

Field of the Invention

The invention relates to a radial shaft sealing ring according to the preamble of claim 1, a radial shaft seal and a radial shaft seal arrangement. Such a radial shaft sealing ring is known, e.g., from U.S. Pat. No. 4,350,347 A.

Background of the Invention

Radial shaft sealing rings (RSSR) are ready-to-install sealing elements with a radially arranged sealing lip for sealing shafts and axles. According to one design, the radial shaft sealing rings consist of a retaining portion which is usually provided with a metallic stiffening ring, a sealing lip which extends in the direction of the central axis of the radial shaft sealing ring away from the retaining portion, and a preloading element in the form of a rubber-elastic preloading ring or a tension coil spring or a coil compression spring. The preloading element is usually arranged on the rear side of the sealing lip, which points away from the sealing edge of the sealing lip, in a retaining groove of the sealing lip.

Such radial shaft sealing rings can have additional functional elements, for example, a dirt or stripper lip or else a support projection for protecting the sealing edge from overloading. Such radial shaft sealing rings can also be provided in an assembly cartridge, in which, possibly, further sealing or functional components can be arranged in a retained manner.

Sufficient lubrication of the dynamic sealing edge which bears against the sealing surface is essential for the service life of the radial shaft sealing ring. For this reason, the sealing lip can have so-called tribostructures on its sealing side, by which the lubrication of the sealing edge is influenced or improved. However, these are subject to high wear during operation.

U.S. Pat. No. 4,350,347 A mentioned above discloses a radial shaft sealing ring with a holding groove which is open to the rear side or open radially outwards, for receiving or inserting a ring spring. A radial shaft sealing ring with a holding groove, which is radially open outwards, and with a through bore, which opens into the holding groove for pressure relief, is known from JP 2013 113320 A.

Further, U.S. Pat. No. 2,434,484 A discloses a radial shaft sealing ring having a sealing lip. A holding inset is inserted in a recess, which is open to one side, and is used to receive a ring spring.

Moreover, a radial shaft sealing with a radial shaft sealing ring and with a ring spring embedded therein in a fixed manner is known from U.S. Pat. No. 5,928,676 A. The radial shaft sealing ring has L-shaped pockets which are separated from each other by webs. Due to manufacturing, a radial pocket portion and an axial pocket portion are open to the ring spring or are tangent on the ring spring.

SUMMARY OF THE INVENTION

It is therefore the object of the invention to provide a radial shaft sealing ring, a radial shaft seal and a radial shaft sealing arrangement, which allow improved lubrication in the sealing gap to be sealed by the radial shaft sealing ring.

The object concerning the radial shaft sealing ring is achieved by a radial shaft sealing ring as claimed in claim 1. The radial shaft seal according to the invention is specified in claim 11, and the radial shaft seal arrangement is specified in claim 13.

The radial shaft sealing ring according to the invention serves to seal a sealing gap between a shaft and a machine part surrounding the shaft. The radial shaft sealing ring comprises a retaining portion and a sealing lip extending away from the retaining portion in a direction axial to the central axis of the radial shaft sealing ring as far as its free edge.

The sealing lip comprises a sealing side which has a sealing edge for bearing in a dynamically sealing manner against the sealing surface of the shaft or the machine part, and a rear side pointing away from the sealing edge in the radial direction, which is provided with a retaining groove for receiving an elastically deformable preloading element. By means of the retaining element, the sealing edge, in the operating use of the radial shaft sealing ring, can be preloaded in a dynamically sealing manner in a radial direction against the sealing surface of the shaft or the machine part.

According to the invention, the sealing lip has radial depressions on the groove bottom of the retaining groove, which are spaced apart from one another in the circumferential direction of the radial shaft sealing ring, wherein each depression has a radial depth which is 10 to 40% of the nominal thickness of the sealing lip, measured between sealing edge and groove bottom, of the retaining groove. In other words, the groove bottom is height-structured in the circumferential direction. As an alternative or in addition, the sealing lip has a plurality of edge cutouts, each extending in a radial direction from the retaining groove as far as the sealing side. Each edge cutout is adjacent to the sealing edge or is arranged spaced apart from the sealing edge in order not to compromise the sealing capacity of the radial shaft sealing ring. The edge cutouts are spaced apart from each other in the circumferential direction of the radial shaft sealing ring.

In both embodiments of the invention, the contact pressure of the sealing edge caused by the preloading element and, possibly, an inherent elasticity of the radial shaft sealing ring can be variably adjusted in the circumferential direction. When the radial shaft sealing ring is installed, if there is a so-called overlap between the sealing ring and the sealing surface, i.e., an elastic deformation of the sealing lip in a radial direction caused by the installation, a contact pressure course between the sealing edge and the sealing surface which is advantageously discontinuous over the circumference is already ensured by the edge cutouts on the oil side of the sealing lip. In this case, additional tongue groove modification by way of the groove bottom-side depressions is not absolutely necessary. These can nevertheless be used to further modify the contact pressure profile.

If, in contrast, there is no overlap between the sealing ring and the shaft to be sealed with the sealing ring due to the elastic deformation of the sealing lip during installation, the groove bottom-side depressions are particularly effective in order to cause a changed contact pressure course between the sealing edge and the associated sealing surface. Due to the variable, i.e., discontinuous, contact pressure course over the circumference, the sealing edge wear can be reduced in operating use of the radial shaft sealing ring, the sealing edge can be effectively lubricated or cooled and, as a result, undesired oil carbon formation can be effectively counteracted. Overall, this can improve the service life of the radial shaft sealing ring.

If the sealing edge is unavoidably worn during operation, it becomes apparent that the wear width of the sealing edge in the region of the depressions/edge cutouts is less pronounced than in the regions without such depressions/edge cutouts. Therefore, a degressive wear behaviour becomes apparent.

In the region of the depressions, the contact pressure between the preloading element and the retaining groove of the radial shaft sealing ring is reduced, thus reducing the friction force which acts. This is advantageous in operating conditions which lead to a frequent resulting movement of the preloading element, as occurs, for example, in the case of a pronounced dynamic eccentricity of the shaft. One alternative measure is, for example, a friction-reducing coating of the retaining groove.

Very particularly preferably, the cutouts break through the groove bottom of the retaining groove. If the retaining groove has a rounded, in particular, a circular, cross-sectional shape, the groove bottom is to be understood as that groove portion via which a radially directed force with respect to the central axis of the radial shaft sealing ring can usually be exerted on the sealing lip by means of a preloading element arranged in the retaining groove. In operating use of the radial shaft sealing ring, this development enables a particularly large variability of the contact pressure course between the sealing edge and the sealing surface respectively associated with the sealing edge. As a result, the range of applications of the radial shaft sealing ring can be extended, in particular, to high-speed applications, such as electric motors in the field of electromobility, pumps or else (electric) tools.

If the sealing lip of the radial shaft sealing ring has both the abovementioned depressions and edge cutouts, at least one edge cutout can be arranged aligned in an axial direction with a depression. In particular, some or else all edge cutouts can be arranged aligned in an axial direction with depressions. In operating use of the radial shaft sealing ring, a significantly smaller contact pressure of the sealing edge and the associated sealing surface of the shaft or the machine part can thus be realized in these regions in comparison with the circumferential portions of the sealing lip without such depressions/cutouts. This is particularly advantageous for the lubrication of the dynamic contact region of the sealing lip and the sealing surface with a lubricant used in each case in operating use.

According to a further exemplary embodiment, at least one edge cutout is arranged offset in the circumferential direction with respect to a depression. In particular, some edge cutouts and some depressions or else all edge cutouts and all depressions can be arranged offset in the circumferential direction relative to each other. Here, the recesses and the depressions can be arranged "staggered" in the axial direction relative to each other. In operating use of the radial shaft sealing ring, an even more differentiated or fine-grained adjustment of the contact pressure course of the sealing edge and the sealing surface can thus be realized. In addition to the simply alternating sequence in the circumferential direction of "edge cutout, depression, edge cutout, depression, etc.", other alternating sequences of edge cutouts and depressions are also possible, such as "edge cutout, edge cutout, depression, edge cutout, edge cutout, etc.". It goes without saying that other non-alternating sequences or arrangements comprising alternating and non-alternating sequences of edge cutouts and/or depressions are also possible.

In a combination of these two exemplary embodiments, some of the depressions are arranged axially aligned with some cutouts, and additional depressions are arranged between this aligned arrangement, that is to say, the aligned depression-cutout arrangement and the additional depressions are arranged offset in the circumferential direction relative to each other, in particular, are arranged staggered in the axial direction relative to the aligned depression-cutout arrangement. As a result, a detailed influence on the contact pressure course can be achieved once again, which is particularly adapted to the operating conditions.

In accordance with one development of the invention, the edge cutouts of the sealing lip can each have a, preferably at least 2-fold or even 4-fold, larger circumferential extension than the free edges of the sealing lip which are arranged between the edge cutouts in each case. Thus, in the circumferential direction of the sealing lip, first longer sealing edge segments, which are arranged at a peripheral position, corresponding to the edge cutouts, of the radial shaft sealing ring and therefore bear in operating use with a smaller contact surface pressure against the sealing surface, alternate with second shorter sealing surface segments with a respectively larger contact pressure.

According to one embodiment of the invention, the sealing lip has a shoulder on its sealing side on the high-pressure side of the sealing edge. Such a shoulder can be used to mechanically stiffen the sealing lip in the region close to the sealing edge. This is advantageous for the sealing capacity of the radial shaft sealing ring, in particular, when there are edge cutouts of the sealing lip. In addition, such a shoulder can counteract the risk of undesired damage to the sealing edge during the production process of the radial shaft sealing ring particularly effectively.

The edge cutouts can each have an arcuate, in particular, circular line-shaped contour, a rectangular, a triangular contour or a free-form contour. The geometric design of the edge cutouts can influence the contact pressure transition between the regions with and without cutouts. The geometric design of the edge cutouts can advantageously swirl the fluid/medium/oil to be sealed, with the result that its through-mixing is improved and/or temperature differences are reduced. It should be noted here that a rectangular geometry of the edge cutouts can be advantageous in a so-called grease seal, since more grease can thus adhere to the sealing lip near the sealing contact.

The sealing lip of the radial shaft sealing ring can comprise an rubber-elastomerically deformable material or polytetrafluoroethylene (PTFE), a PTFE compound or another viscoelastically deformable material or can consist of one of these materials.

The radial shaft seal according to the invention comprises a radial shaft sealing ring as described above and an (annular) clamping element which is arranged in the retaining groove of the sealing lip of the radial shaft sealing ring. In the case of a radial shaft sealing ring of internally sealing configuration, the clamping element can preferably be configured in the form of a tension spring or an elastomeric clamping ring and, in the case of a radial shaft sealing ring of externally sealing configuration, can preferably be configured in the form of a compression spring.

In principle, the shaft sealing ring according to the invention can also be configured as an axial shaft sealing ring, wherein the clamping element is designed, for example, as a star spring. In the case of a shaft sealing ring according to the invention, in an embodiment of an axial shaft sealing ring, a person skilled in the art is aware of the direction-related adjustments to be observed.

If the radial shaft sealing ring is provided with the abovementioned depressions, these can have such a radial depth according to the invention that the clamping element does not make contact with the groove bottom of the retaining groove, i.e., the sealing lip, over the circumferential extent of the depression. In a corresponding manner, the edge cutouts can extend in the axial direction far into the retaining groove and/or beyond, with the result that there is no groove bottom in the region of the edge recesses.

The radial shaft seal arrangement according to the invention comprises a shaft and a machine part surrounding the shaft, which are spaced apart from each other and arranged movably relative to each other about a movement axis, while forming a sealing gap. The sealing gap is sealed by a radial shaft seal, the radial shaft sealing ring of which bears in a dynamically sealing manner preloaded with its sealing edge against a sealing surface of the machine part or the shaft by means of the preloading element. The radial shaft seal arrangement is suitable, in particular, for high-speed applications or other thermally critical applications, in which the aim is radial shaft seal maintenance intervals which are as long as possible.

It goes without saying that the radial shaft sealing ring can be provided with other components, in particular, support elements, retaining elements, seals, in a ready-to-install cartridge. The cartridge can comprise a rubber-elastomerically or a viscoelastically deformable material.

The radial shaft sealing ring can also be used with further seals, in particular, a further radial shaft sealing ring, for instance in the so-called back-to-back arrangement. It also goes without saying that the radial shaft sealing ring can have a dust lip and further functional attachments or integrated components.

Further advantages of the invention result from the description and the drawing. The embodiments shown and described are not to be understood as a final enumeration, but rather have an exemplary character for the description of the invention.

DETAILED DESCRIPTION OF EMBODIMENTS OF THE INVENTION

Figure 1:
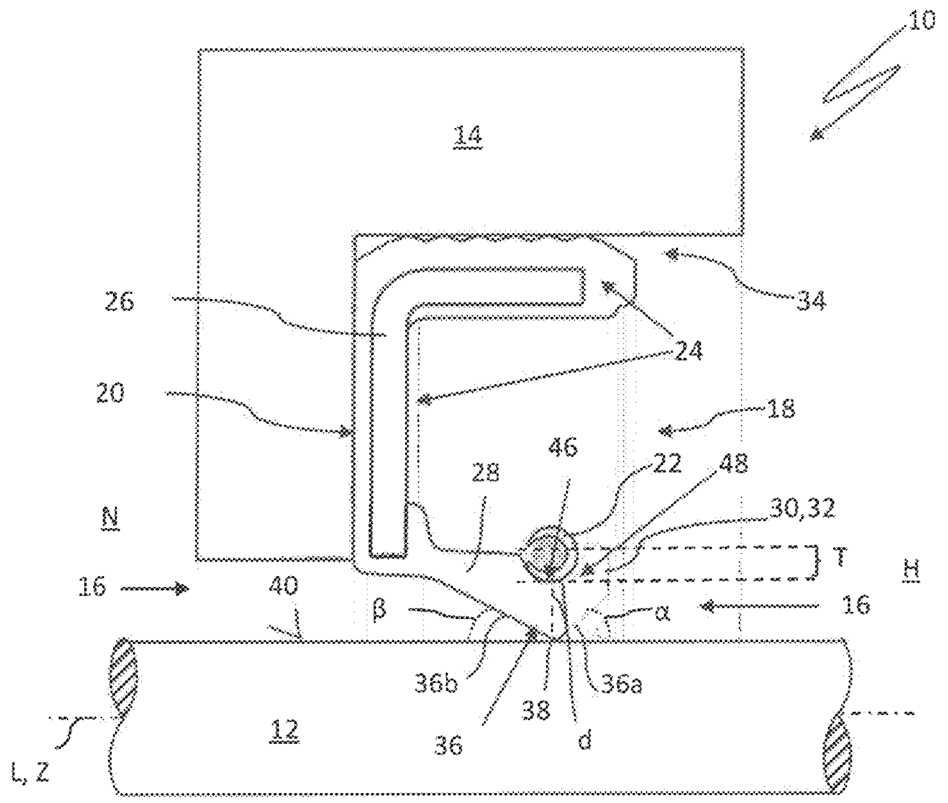
FIG. 1 shows a radial shaft seal arrangement comprising a shaft, a machine part which encompasses the shaft forming a sealing gap, and a radial shaft seal for sealing the sealing gap.
Figure 2:
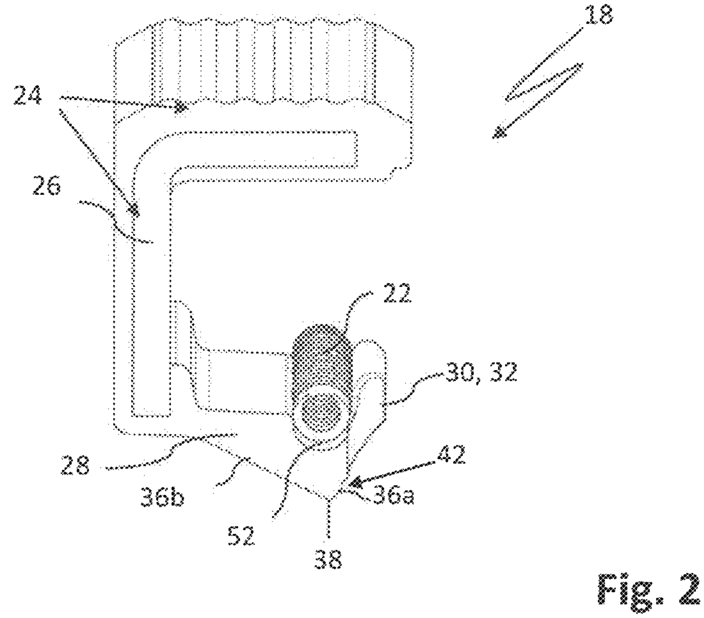
FIG. 2 shows the radial shaft seal according to FIG. 1 in an exposed view, comprising a radial shaft sealing ring with a preloading element and edge cutouts, through which a highly variable contact pressure course in the circumferential direction of the radial shaft sealing ring is brought about between the sealing edge and the counter-running or sealing surface.

FIG. 1 shows a radial shaft seal arrangement 10 with a shaft 12 and with a machine part 14 surrounding the shaft 12, which are spaced apart from each other forming a sealing gap 16 and are arranged movably relative to each other about a movement axis L. A radial shaft seal 18 is used to seal an oil or high-pressure side H (=side to be sealed) with respect to an external or low-pressure side N of the sealing gap 16.

The radial shaft seal 18 comprises a radial shaft sealing ring 20 and an annular and elastomerically deformable preloading element 22. The radial shaft sealing ring 20 is shown in FIGS. 2 to 5 in further details. The radial shaft sealing ring 20 comprises a retaining portion 24 which has an L-shaped cross section by way of example here. The retaining portion is provided in a manner known per se with a stiffening element 26. The radial shaft sealing ring comprises a sealing lip 28 which extends away from the retaining portion 24 in an axial direction with respect to the central axis Z of the radial shaft sealing ring 20. A free edge 30 of the sealing lip 28 is formed here by an end side 32. The retaining portion 24 is arranged in a mounting groove 34 of the machine part 14 which is open on one side in the axial direction. It goes without saying that the radial shaft seal 18 can also be arranged in a mounting cartridge (not shown) or another sleeve-shaped retaining device, as is familiar to a person skilled in the art. In this respect, for example, the machine part 14 itself can be configured as a mounting cartridge.

The sealing lip 28 has a sealing side 36 with a sealing edge 38 which bears dynamically sealingly against the sealing surface 40 of the shaft 12 in a manner preloaded in a radial direction by means of the preloading element 22.

The sealing side 36 has a first surface segment 36*a*, arranged on the oil side or high-pressure side, and a second surface segment 36*b*, arranged on the low-pressure side, which, in the installed state of the radial shaft sealing ring 20, are each arranged so as to run obliquely at a (contact surface) angle $\alpha$, $\beta$ with respect to the sealing surface 40. The angle $\alpha$ open to the high-pressure side H is greater in a manner known per se than the angle $\beta$ open to the low-pressure side N.

The sealing lip 28 can form a shoulder 42 on its sealing side 36 on the high-pressure side of the sealing edge 38, which shoulder enables protection of the sealing edge 38 against undesirable damage during the manufacture of the radial shaft sealing ring.

The sealing lip 28 has, on its rear side 44 which points away from the sealing edge 38, a retaining groove 46 which runs around annularly. The preloading element 22 is arranged in this retaining groove 46.

Figure 3:
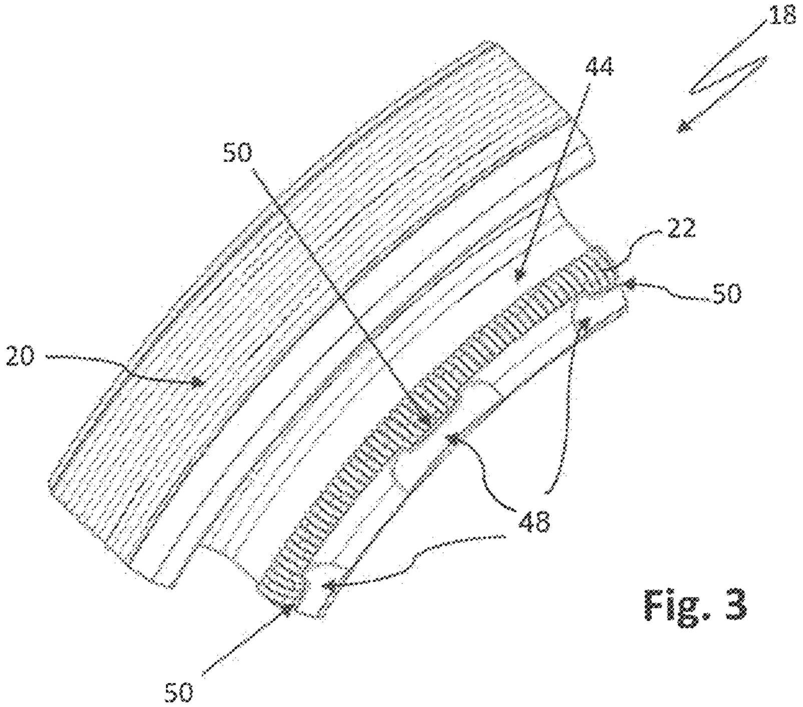
FIG. 3 shows the radial shaft seal according to FIG. 2 in a detail of a rear plan view.
Figure 4:
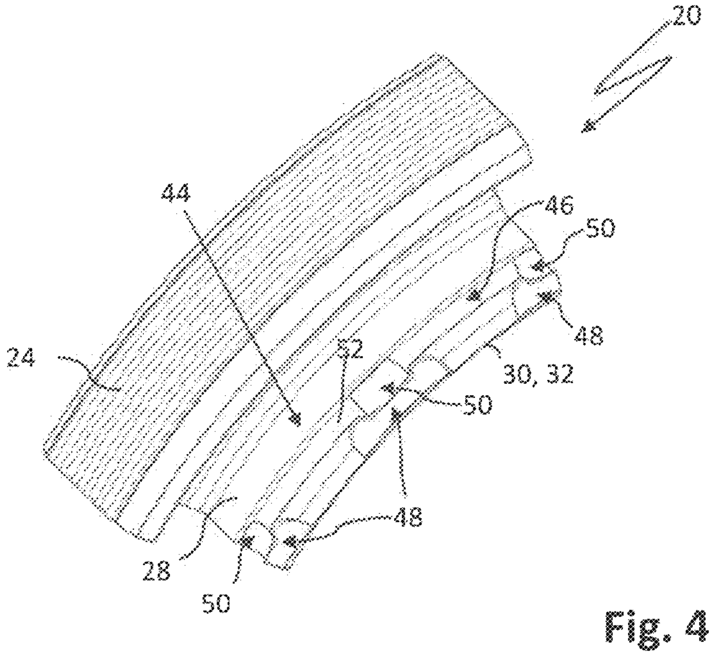
FIG. 4 shows the radial shaft sealing ring according to FIG. 2 in an exposed rear-side detail.
Figure 5:
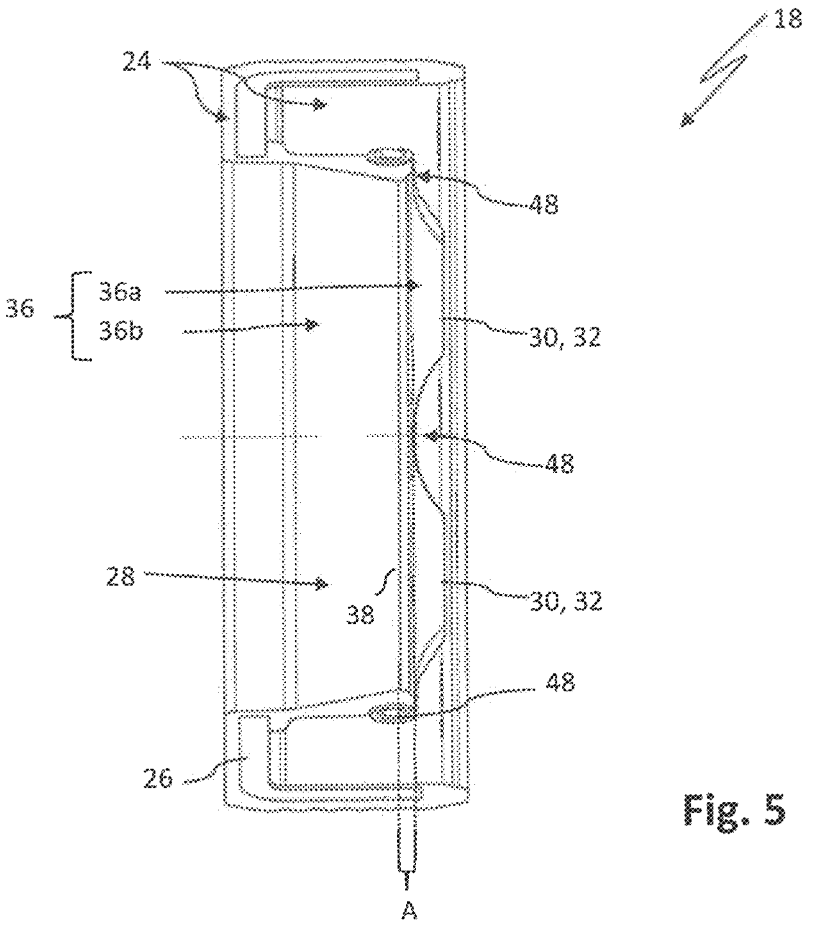
FIG. 5 shows the radial shaft seal according to FIG. 2 in a sealing edge-side detail.

The sealing lip 28 is provided with a plurality of edge cutouts 48 which are arranged here spaced apart from each other in the circumferential direction of the radial shaft sealing ring 20. A free edge segment of the sealing lip 28 is arranged between each edge cutout 48. The edge cutouts 48 extend in an axial direction from the circumferential contour of the free edge 30, that is to say the end side 32, of the sealing lip 28 as far as the retaining groove 46 and break through the entire sealing lip 28 in a radial direction. The retaining groove 46 is thus partially broken through in the axial direction toward the high-pressure side H, as shown in FIGS. 3 to 5. Each edge cutout 48 is spaced apart from the sealing edge 38 in order not to compromise the sealing capacity of the radial shaft sealing ring 20.

According to FIG. 4, the radial shaft sealing ring 20 has, in addition to the edge cutouts 48, depressions 50 of the retaining groove 46. The depressions 50 are arranged regularly spaced apart from each other in the circumferential direction of the radial shaft sealing ring 20. Each recess 50 can, for example, have a radial depth t which is 10 to 40%, in particular, 10% to 20% of the nominal thickness d of the sealing lip 28, measured between sealing edge 38 and groove bottom 52, of the retaining groove 46.

The edge cutouts 48 are arranged aligned in an axial direction here in each case with respect to one of the depressions 50. As a result, the contact surface pressure between the sealing edge 38 and the sealing surface 40 can be varied particularly effectively in the circumferential direction. It should be noted that the edge cutouts 48 and the depressions 50 of the retaining groove 46 can also be arranged offset in the circumferential direction with respect to each other, in particular, can be arranged staggered in the axial direction relative to each other. As a result, the contact surface pressure between sealing edge 38 and sealing surface 40 can be adjusted locally in fine steps. Some of the depressions can also be arranged aligned axially with some cutouts, and additional depressions can be arranged between these aligned depression-cutout arrangements, with the result that the aligned depression-cutout arrangements and the additional depressions are arranged offset in the circumferential direction relative to each other, in particular, are arranged staggered in the axial direction.

In the installed state of the radial shaft sealing ring 20, in the case of an existing so-called overlap between the sealing lip 28 and the sealing surface 40, i.e., an elastic deformation of the sealing lip 28 in a radial direction caused by the installation of the radial shaft sealing ring 20, an advantageous contact pressure course over the circumference between sealing edge 38 and sealing surface 40 (FIG. 1) is already ensured by the edge cutouts 48 on the oil side H of the sealing lip 28. In this case, an additional spring groove modification by the groove bottom-side depressions 50 is not absolutely necessary. These can nevertheless be used to further modify the contact pressure course.

According to the plan view shown in FIG. 5 of the sealing edge 38 of the radial shaft sealing ring 20, the individual edge cutouts 48 of the sealing lip 28, in particular, can be of circular line-shaped configuration.

Figure 6:
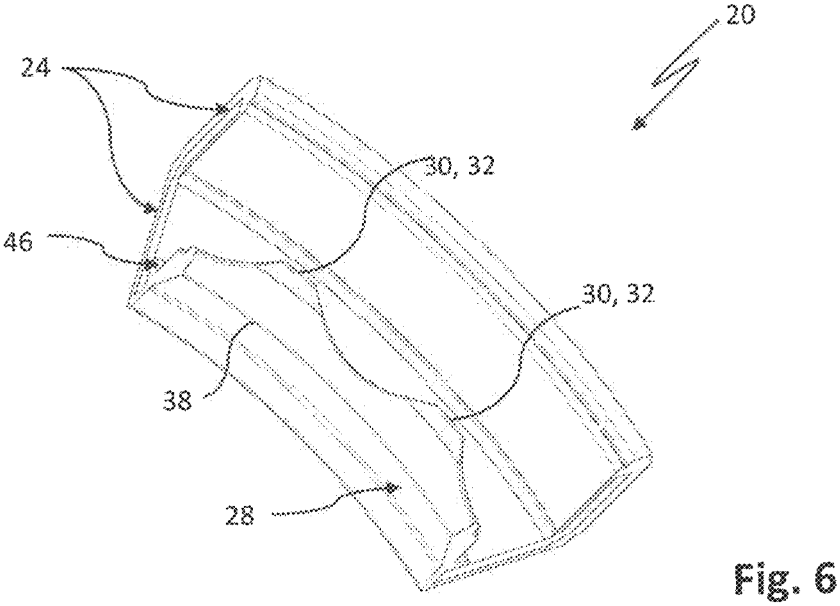
FIG. 6 shows a further exemplary embodiment of the radial shaft sealing ring, in which the edge cutouts are at a large spacing from the sealing edge, in a perspective detail.

The radial shaft sealing ring 20 shown in FIG. 6 differs from the radial shaft sealing ring 20 shown in FIGS. 2 to 5 substantially in that the edge cutouts 48 (with an identical diameter of the radial shaft sealing ring 20) each have a comparatively larger circumferential extent and are spaced further apart from the sealing edge 38. This design of radial shaft sealing ring 20 affords manufacturing advantages, especially since undesirable damage to the sealing edge 38 during the production process can be avoided even more reliably as a result.

Figure 7:
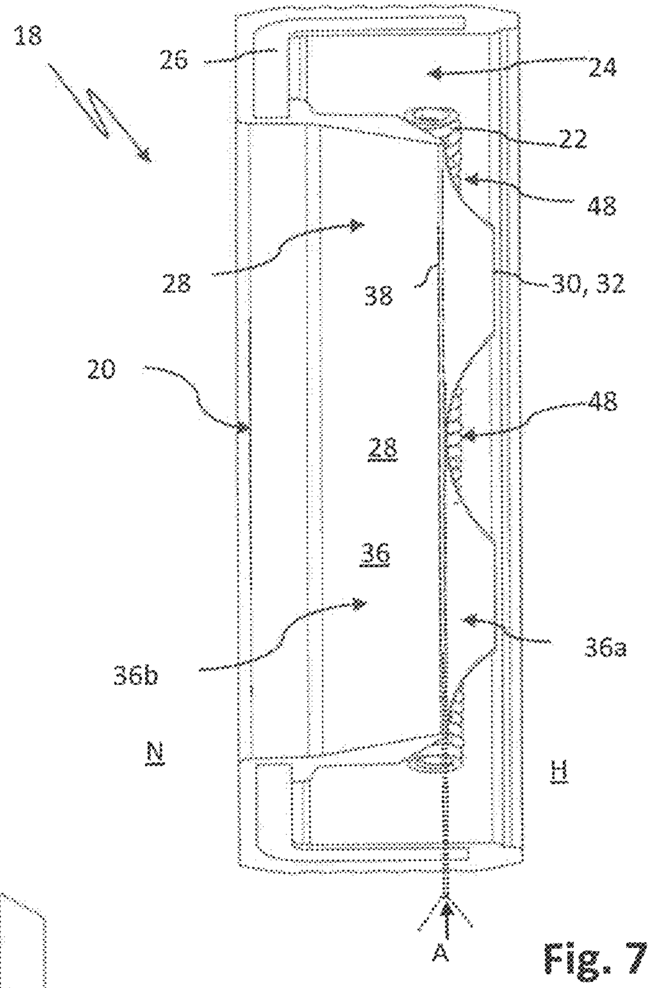
FIG. 7 shows a radial shaft seal, in which the edge cutouts of the sealing lip of the radial shaft sealing ring extend almost as far as the sealing edge of the sealing lip and the edge cutouts extend in the axial direction far into the retaining groove, with the result that a groove bottom is missing in the region of the edge cutouts, in a sealing edge-side detail.
Figure 8:
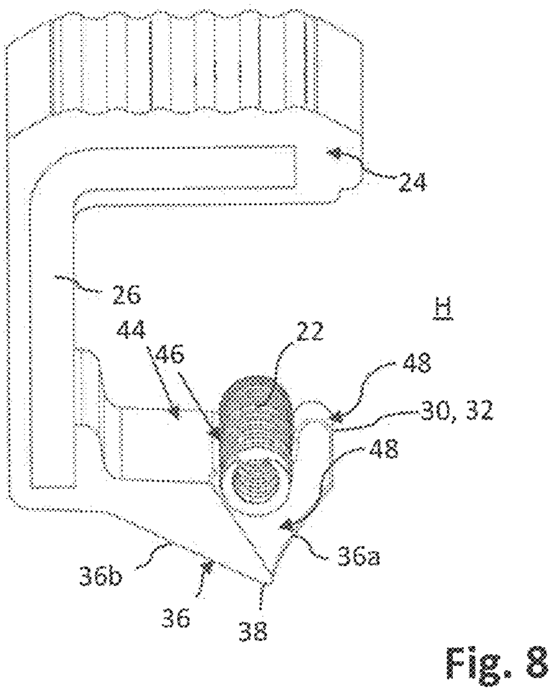
FIG. 8 shows the radial shaft seal according to FIG. 7, in a view analogous to FIG. 2.

According to the radial shaft sealing ring 20 shown in FIGS. 7 and 8, the edge cutouts 48 can completely break through the groove bottom 52 of the retaining groove in the axial direction and, if necessary, extend almost as far as the sealing edge 38 on the sealing side. In this case, the preloading element 22, here the tension spring, is not covered in a radial direction at least in sections by the sealing lip 28 in the radial direction. As shown in FIG. 8, the preloading element 22 does not bear against the sealing lip 28 over the circumferential extent of the respective edge cutout 48. The preloading element 28 is no longer in contact with the groove bottom in this region (and “hangs” in these areas “in the air”, as it were).

Figure 9:
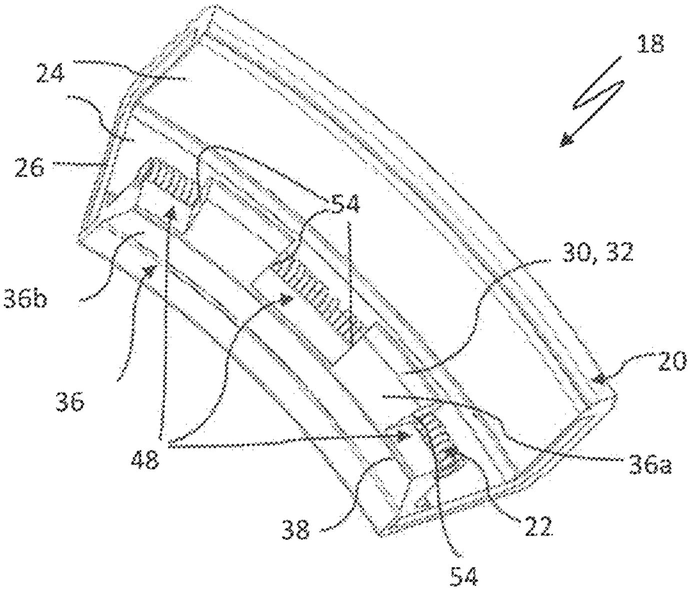
FIG. 9 shows a radial shaft seal, in which the radial shaft sealing ring has edge cutouts of rectangular configuration, in a perspective detailed view.
Figure 10:
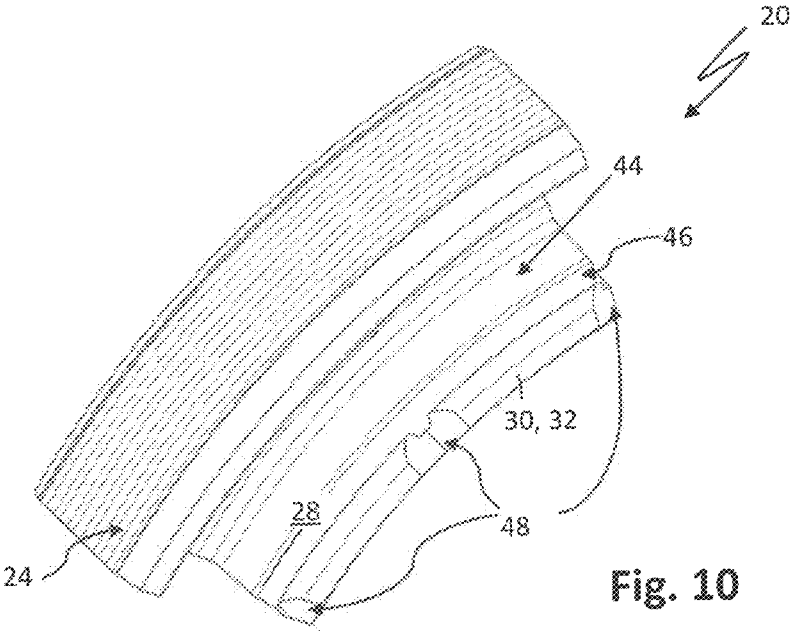
FIG. 10 shows a radial shaft sealing ring with edge cutouts of triangular configuration, in a detail.

The edge cutouts 48 of the sealing lip 28 of the radial shaft sealing ring 20 can in each case be of rectangular configuration according to the exemplary embodiment shown in FIG. 9. As a result, a particularly steep gradient of the contact pressure course between the sealing edge 38 and the sealing surface 40 (FIG. 1) can be achieved in the sealing edge zones corresponding to the circumferential side walls 54 of the edge cutouts 48. As a result of edge cutouts 48 with a triangular geometry, as shown in FIG. 10, a yet further improved lubrication and cooling of the sealing edge 38 can be achieved due to the converging side walls 54 of the edge cutouts 48, regardless of the direction of rotation.

Figure 11:
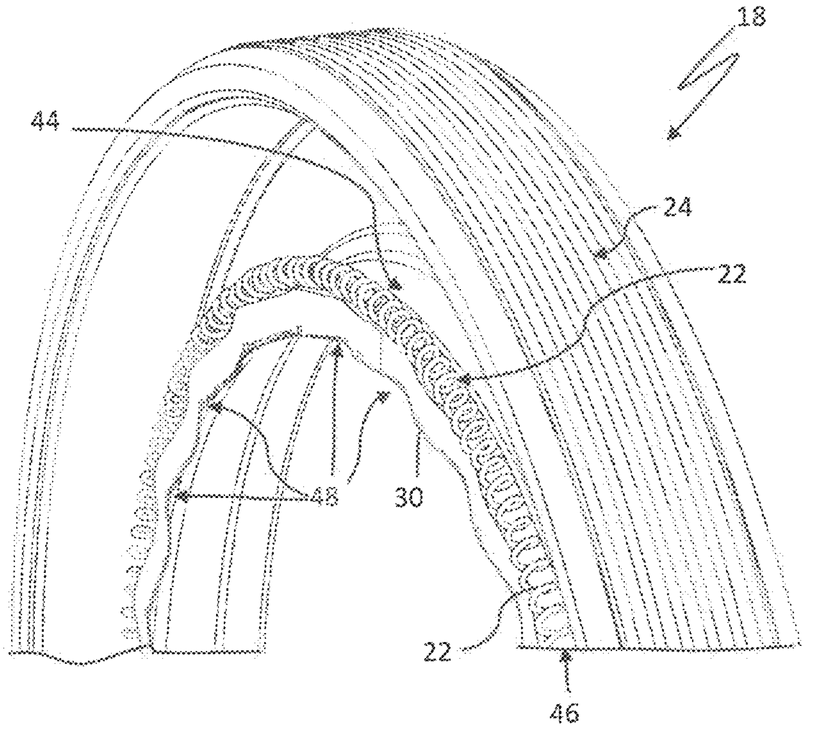
FIG. 11 shows a radial shaft seal, in which the radial shaft sealing ring has a sealing lip with edge cutouts of undulating configuration and an undulating sealing edge, in a detail.

The edge cutouts 48 can also be arranged directly behind one another in the circumferential direction of the radial shaft sealing ring 20 according to the radial shaft sealing ring 20 shown in FIG. 11. In this case, an undulating free edge 30 of the sealing lip 28 can result. In a corresponding manner, the sealing edge 38 can also be of undulating configuration in the circumferential direction. As a result, the lubrication of the sealing edge 38 can be further favored in operating use.

The sealing lip 28 of the radial shaft sealing rings 20 shown above in conjunction with FIGS. 1 to 11 can each comprise a rubber-elastomerically deformable material or polytetrafluoroethylene (PTFE), a PTFE compound or another viscoelastically deformable material or consist of one of these materials. Likewise, the radial shaft sealing rings 20 can also be of externally sealing configuration. In this case, the preloading element 22 is preferably configured as an externally loading compression spring or the like.

In summary, the invention relates to a radial shaft sealing ring 20 comprising a retaining portion 24 and a sealing lip 28, which extends away from the retaining portion 24 in a direction axial to the central axis Z of the radial shaft sealing ring 20 as far as its free edge 30. The sealing lip 28 comprises a sealing side which has a sealing edge for dynamically sealingly bearing against the sealing surface of the shaft or the machine part, and a rear side pointing away from the sealing edge in the radial direction, which is provided with a retaining groove for receiving an elastically deformable preloading element, by means of which the sealing edge, in operating use of the radial shaft sealing ring, can be preloaded in dynamically sealing manner in a radial direction against a respective sealing surface 40. The sealing lip has radial depressions at the groove bottom of the retaining groove, which are spaced apart from each other in the circumferential direction of the radial shaft sealing ring, and/or a plurality of edge cutouts, each extending in a radial direction from the retaining groove as far as the sealing side. Each edge cutout 48 is spaced apart from the sealing edge 38 and can break through the groove bottom 52 of the retaining groove 46, if necessary completely.

What is claimed is:

1. A radial shaft sealing ring configured for sealing a sealing gap between a shaft and a machine part surrounding the shaft, comprising a retaining portion and a sealing lip which extends away from the retaining portion in a direction axial to the central axis of the radial shaft sealing ring as far as its free edge, wherein the sealing lip comprises:

a sealing side comprising a sealing edge configured for bearing in a dynamically sealing manner against the sealing surface of the shaft or of the machine part; and a rear side pointing away from the sealing edge in the radial direction, which has a radially outwards open retaining groove for receiving an elastically deformable preloading element, by means of which the sealing edge, in operational use of the radial shaft sealing ring, can be preloaded in a radial direction against the sealing surface of the shaft, wherein the sealing lip has a plurality of edge cutouts, wherein the plurality of edge cutouts are spaced apart from one another in the circumferential direction of the radial shaft sealing ring, wherein each edge cutout makes contact with the sealing edge or is spaced apart from the sealing edge and extends in a radial direction from the sealing side as far as the retaining groove, wherein the edge cutouts break through the groove bottom of the retaining groove.

2. The radial shaft sealing ring as claimed in claim 1, wherein the groove bottom of the retaining groove has radial depressions which are spaced apart from one another in the circumferential direction of the radial shaft sealing ring, wherein each depression has a radial depth which is 10 to 40% of the nominal thickness of the sealing lip, measured between sealing edge and groove bottom, of the retaining groove, and wherein the sealing lip has radial depressions on the groove bottom of its retaining groove, which are spaced apart from one another in the circumferential direction of the radial shaft sealing ring.

3. The radial shaft sealing ring as claimed in claim 1, wherein at least one edge cutout is arranged aligned in the axial direction with respect to a depression, or some or all edge cutouts are arranged aligned in the axial direction with respect to depressions.

4. The radial shaft sealing ring as claimed in claim 1, wherein at least one edge cutout is arranged offset in the circumferential direction with respect to a depression, or some edge cutouts and some depressions or all edge cutouts and all depressions are arranged offset in the circumferential direction with respect to each other.

5. The radial shaft sealing ring as claimed in claim 1, wherein at least some edge cutouts and some depressions, or all edge cutouts and all depressions, are arranged staggered in the axial direction relative to each other.

6. The radial shaft sealing ring as claimed in claim 1, wherein the sealing lip forms a shoulder on its sealing side on the high-pressure side of the sealing edge.

7. The radial shaft sealing ring as claimed in claim 1, wherein the edge cutouts have a larger circumferential extent than the free edges of the sealing lip arranged between the edge cutouts.

8. The radial shaft sealing ring as claimed in claim 1, wherein the edge cutouts have an arcuate, a circular line-shaped contour, a rectangular, a triangular contour or a free-form contour.

9. The radial shaft sealing ring as claimed in claim 1, wherein the sealing lip comprises a rubber-elastomerically deformable material or polytetrafluoroethylene (PTFE), a PTFE compound or another viscoelastically deformable material or consists of one of these materials.

10. A radial shaft seal comprising the radial shaft sealing ring as claimed in claim 1 and a preloading element which is arranged held in the retaining groove of the sealing lip of the radial shaft sealing ring.

11. The radial shaft seal as claimed in claim 10, wherein the depressions have such a radial depth that the preloading element does not make contact with the groove bottom in the region of the depression.

12. A radial shaft seal arrangement, comprising:

the shaft and the machine part surrounding the shaft, which are spaced apart from one another forming the sealing gap and arranged movably relative to each other about the movement axis; and the radial shaft seal as claimed in claim 11, wherein the radial shaft sealing ring bears in a dynamically sealing manner preloaded by means of the preloading element against a sealing surface of the shaft or the machine part.

13. The radial shaft seal arrangement as claimed in claim 12, wherein the sealing lip of the radial shaft sealing ring in the region of the edge cutouts and the preloading element are in a strictly radial direction without mutual overlap.

14. A radial shaft sealing ring configured for sealing a sealing gap between a shaft and a machine part surrounding the shaft, comprising a retaining portion and a sealing lip which extends away from the retaining portion in a direction axial to the central axis of the radial shaft sealing ring as far as its free edge, wherein the sealing lip comprises:

a sealing side comprising a sealing edge configured for bearing in a dynamically sealing manner against the sealing surface of the shaft or of the machine part; and a rear side pointing away from the sealing edge in the radial direction, which has a radially outwards open retaining groove for receiving an elastically deformable preloading element, by means of which the sealing edge, in operational use of the radial shaft sealing ring, can be preloaded in a radial direction against the sealing surface of the shaft;

wherein the sealing lip has a plurality of edge cutouts, wherein the plurality of edge cutouts are spaced apart from one another in the circumferential direction of the radial shaft sealing ring, wherein each edge cutout makes contact with the sealing edge or is spaced apart from the sealing edge and extends in a radial direction from the sealing side as far as the retaining groove, wherein at least one edge cutout is arranged aligned in the axial direction with respect to a depression, or some or all edge cutouts are arranged aligned in the axial direction with respect to depressions.

15. A radial shaft sealing ring configured for sealing a sealing gap between a shaft and a machine part surrounding the shaft, comprising a retaining portion and a sealing lip which extends away from the retaining portion in a direction axial to the central axis of the radial shaft sealing ring as far as its free edge, wherein the sealing lip comprises:

a sealing side comprising a sealing edge configured for bearing in a dynamically sealing manner against the sealing surface of the shaft or of the machine part; and a rear side pointing away from the sealing edge in the radial direction, which has a radially outwards open retaining groove for receiving an elastically deformable preloading element, by means of which the sealing edge, in operational use of the radial shaft sealing ring, can be preloaded in a radial direction against the sealing surface of the shaft;

wherein the sealing lip has a plurality of edge cutouts, wherein the plurality of edge cutouts are spaced apart from one another in the circumferential direction of the radial shaft sealing ring, wherein each edge cutout makes contact with the sealing edge or is spaced apart from the sealing edge and extends in a radial direction from the sealing side as far as the retaining groove, wherein at least one edge cutout is arranged offset in the circumferential direction with respect to a depression, or some edge cutouts and some depressions or all edge cutouts and all depressions are arranged offset in the circumferential direction with respect to each other.

16. A radial shaft sealing ring configured for sealing a sealing gap between a shaft and a machine part surrounding the shaft, comprising a retaining portion and a sealing lip which extends away from the retaining portion in a direction axial to the central axis of the radial shaft sealing ring as far as its free edge, wherein the sealing lip comprises:

a sealing side comprising a sealing edge configured for bearing in a dynamically sealing manner against the sealing surface of the shaft or of the machine part; and a rear side pointing away from the sealing edge in the radial direction, which has a radially outwards open retaining groove for receiving an elastically deformable preloading element, by means of which the sealing edge, in operational use of the radial shaft sealing ring, can be preloaded in a radial direction against the sealing surface of the shaft;

wherein the sealing lip has a plurality of edge cutouts, wherein the plurality of edge cutouts are spaced apart from one another in the circumferential direction of the radial shaft sealing ring, wherein each edge cutout makes contact with the sealing edge or is spaced apart from the sealing edge and extends in a radial direction from the sealing side as far as the retaining groove, wherein at least some edge cutouts and some depressions, or all edge cutouts and all depressions, are arranged staggered in the axial direction relative to each other.

17. A radial shaft sealing ring configured for sealing a sealing gap between a shaft and a machine part surrounding the shaft, comprising a retaining portion and a sealing lip which extends away from the retaining portion in a direction axial to the central axis of the radial shaft sealing ring as far as its free edge, wherein the sealing lip comprises:

a sealing side comprising a sealing edge configured for bearing in a dynamically sealing manner against the sealing surface of the shaft or of the machine part; and a rear side pointing away from the sealing edge in the radial direction, which has a radially outwards open retaining groove for receiving an elastically deformable preloading element, by means of which the sealing edge, in operational use of the radial shaft sealing ring, can be preloaded in a radial direction against the sealing surface of the shaft;

wherein the sealing lip has a plurality of edge cutouts, wherein the plurality of edge cutouts are spaced apart from one another in the circumferential direction of the radial shaft sealing ring, wherein each edge cutout makes contact with the sealing edge or is spaced apart from the sealing edge and extends in a radial direction from the sealing side as far as the retaining groove, wherein the edge cutouts have a larger circumferential extent than the free edges of the sealing lip arranged between the edge cutouts.

18. A radial shaft sealing ring configured for sealing a sealing gap between a shaft and a machine part surrounding the shaft, comprising a retaining portion and a sealing lip which extends away from the retaining portion in a direction axial to the central axis of the radial shaft sealing ring as far as its free edge, wherein the sealing lip comprises:

a sealing side comprising a sealing edge configured for bearing in a dynamically sealing manner against the sealing surface of the shaft or of the machine part; and a rear side pointing away from the sealing edge in the radial direction, which has a radially outwards open retaining groove for receiving an elastically deformable preloading element, by means of which the sealing edge, in operational use of the radial shaft sealing ring, can be preloaded in a radial direction against the sealing surface of the shaft;

wherein the sealing lip has a plurality of edge cutouts, wherein the plurality of edge cutouts are spaced apart from one another in the circumferential direction of the radial shaft sealing ring, wherein each edge cutout makes contact with the sealing edge or is spaced apart from the sealing edge and extends in a radial direction from the sealing side as far as the retaining groove, wherein the edge cutouts have an arcuate, a circular line-shaped contour, a rectangular, a triangular contour or a free-form contour.

19. A radial shaft sealing ring configured for sealing a sealing gap between a shaft and a machine part surrounding the shaft, comprising a retaining portion and a sealing lip which extends away from the retaining portion in a direction axial to the central axis of the radial shaft sealing ring as far as its free edge, wherein the sealing lip comprises:

a sealing side comprising a sealing edge configured for bearing in a dynamically sealing manner against the sealing surface of the shaft or of the machine part; and a rear side pointing away from the sealing edge in the radial direction, which has a radially outwards open retaining groove for receiving an elastically deformable preloading element, by means of which the sealing edge, in operational use of the radial shaft sealing ring, can be preloaded in a radial direction against the sealing surface of the shaft;

wherein the sealing lip has a plurality of edge cutouts, wherein the plurality of edge cutouts are spaced apart from one another in the circumferential direction of the radial shaft sealing ring, wherein each edge cutout makes contact with the sealing edge or is spaced apart from the sealing edge and extends in a radial direction from the sealing side as far as the retaining groove, wherein the sealing lip of the radial shaft sealing ring in the region of the edge cutouts and the preloading element are in a strictly radial direction without mutual overlap.

* * * * *